_United States Patent_ [19]

Katcher et al.

[11] Patent Number: 4,469,712

[45] Date of Patent: Sep. 4, 1984

[54] DRY INSTANT PUDDING MIX

[75] Inventors: Jay H. Katcher, Dover, Del.; Frank DelValle, Croton-on-Hudson, N.Y.

[73] Assignee: General Foods Corporation, White Plains, N.Y.

[21] Appl. No.: 456,684

[22] Filed: Jan. 10, 1983

[51] Int. Cl.³ .............................................. A23L 1/187
[52] U.S. Cl. ..................................... 426/579; 426/578
[58] Field of Search ................ 426/579, 578, 661, 573

[56] References Cited

U.S. PATENT DOCUMENTS

| | | | |
|---|---|---|---|
| 2,257,599 | 9/1941 | Frischmuth et al. | 426/579 |
| 2,554,143 | 5/1951 | Hinz et al. | 426/579 |
| 2,613,150 | 10/1952 | Halden | 426/579 |
| 2,801,924 | 8/1957 | Clausi | 426/579 |
| 3,326,696 | 6/1967 | Decnop | 426/579 |
| 3,464,857 | 9/1969 | Marotta | 426/579 |
| 3,582,350 | 1/1971 | Werbin | 426/579 |
| 4,006,262 | 2/1977 | Smith et al. | 426/579 |
| 4,361,592 | 11/1982 | Carpenter et al. | 426/579 |

_Primary Examiner_—Jeanette M. Hunter
_Attorney, Agent, or Firm_—Walter Scott; Thomas R. Savoie; Daniel J. Donovan

[57] ABSTRACT

An improved dry instant pudding mix which upon hydration yields a pudding with an improved texture and gloss is prepared by incorporating a critical starch particle size distribution with a powdered sugar of a controlled particle size.

5 Claims, 7 Drawing Figures

DRY INSTANT PUDDING MIX

BACKGROUND OF THE INVENTION

The present invention relates to a composition that, when hydrated, produces a smooth and creamy textured, glossy pudding.

In recent years there has been a pronounced trend towards convenience in food preparation. Instant puddings—i.e. a pudding that can be simply prepared from a dry mix without cooking—are illustrative of this trend. However, as this trend matured, a movement within the convenience food industry to improve the product quality of convenience foods has developed. U.S. Pat. No. 4,361,592 issued to Carpenter et al., which is hereby incorporated by reference, describes a pudding mix composition which, when combined with milk, produces a desirable, creamy, glossy pudding. Nonetheless, Carpenter et al. teach that it is critical to making a glossy, creamy pudding with fine particles of pregelatinized starch that less than a maximum of 1%, by weight, of the starch has a particle diameter greater than 63 microns, (i.e. retained on a 230 mesh U.S. Standard screen).

Commercial pregelatinized starch does not meet the requirements of Carpenter et al. without further processing. Rather, a substantial portion of the pregelatinized starch particles will, initially, exceed a 63 micron diameter—typically 40% or more. These large starch particles must be repeatedly ground and sieved to ensure that less than 1% of the starch is retained on a 230 mesh screen (U.S. Standard size) (63 microns or greater). If these strict guidelines are followed, then the improved product of Carpenter et al. is obtained. It is noteworthy that, while the amount of starch that must be reground can be reduced by adjusting either the pregelatinization process or the grinders to produce very small particles, the usual result of these procedures is that more than 80% of the starch will be less than 38 microns in diameter (pass through a 400 mesh U.S. Standard screen). However, Carpenter et al. teach that it is also critical that 80% or less of the starch particles have a diameter less than 38 microns. Thus the Carpenter et al. tolerances necessitate recycling the starch particles—seiving, and regrinding—thereby increasing the cost of production. Consequently, there is a need for a more tolerant instant pudding composition which will still produce a pudding with improved textural properties characteristic of small starch particles.

An alternative means for using fine starch particles in an instant pudding mix is provided by U.S. Pat. No. 2,554,143 issued to Hinz et al. Hinz et al. teach that fine starch particles can be used in an instant pudding mix, only if their rate of hydration is retarded. Hinz et al. achieve the hydration rate retardation by coating the starch with a hydrophobic material, such as a lipid or talc. The problem Hinz et al. recognized is that when fine starch particles hydrate, there is a tendency for these particles to lump to the point where it is quite difficult to prepare a smooth pudding product.

SUMMARY OF THE INVENTION

According to the present invention, the problems of small starch particles lumping can be avoided without either the critical hydrophobic coating of Hinz et al. or the critical 1% maximum of Carpenter et al. The present invention is based upon the discovery that a newly recognized critical aspect can produce the highly desirable glossy, smooth and creamy texture characteristic of an instant pudding made from very fine starch particles. This new critical aspect is the total starch particle distribution. When the vast majority of the starch particles have diameters smaller than 38 microns, between 1% and 10% of the starch may be greater than 63 microns in diameter if this 1 to 10 percent has a distribution that is greatly skewed in favor of 63 to 88 micron diameter starch particles.

DETAILED DESCRIPTION OF THE INVENTION

Figure 1:
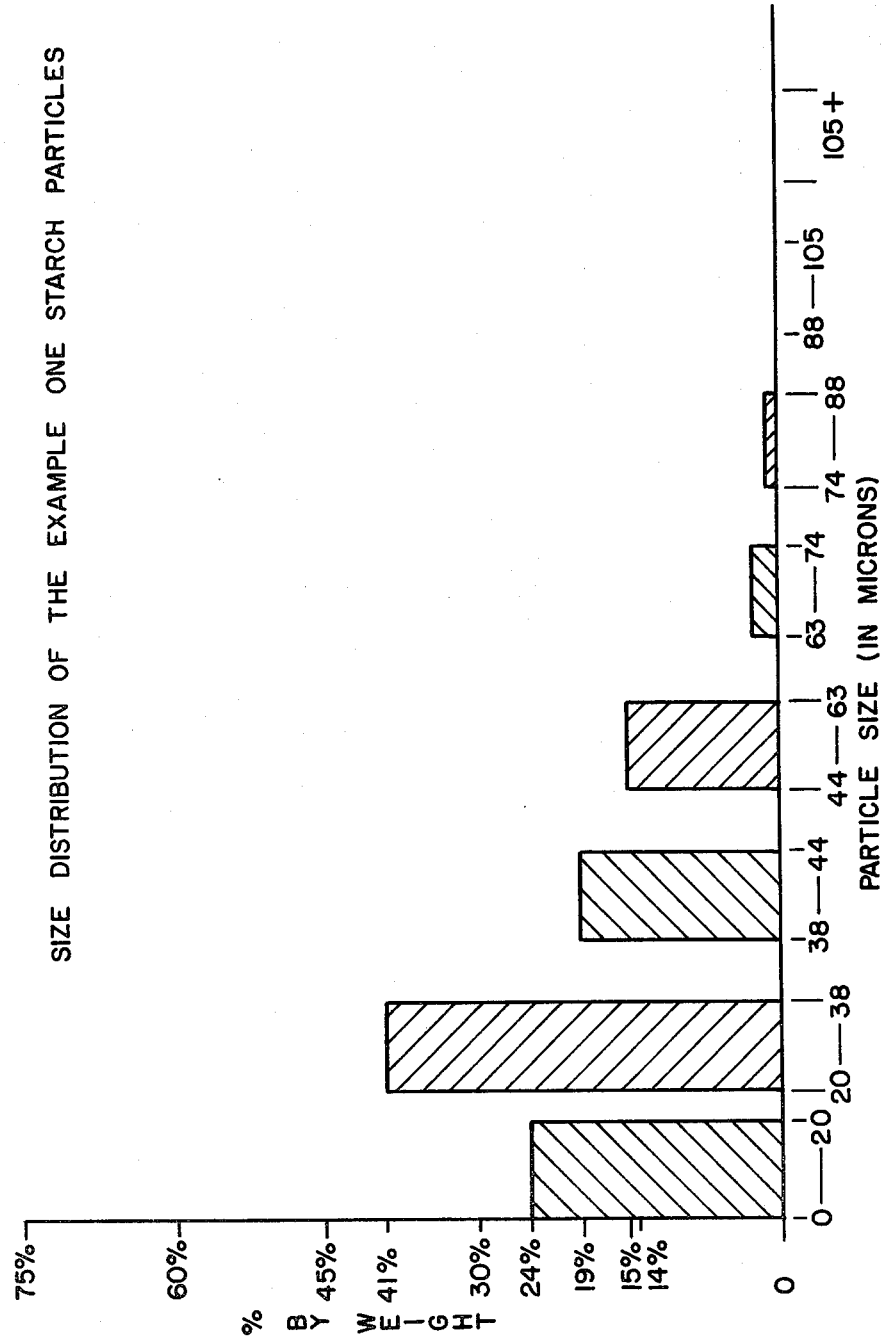
FIG. 1 shows the distribution of the Example 1 starch particles within each of eight size fractions.

A starch based dry instant pudding mix having upon hydration an improved glossy, smooth and creamy texture and appearance is prepared by incorporating a pregelatinized starch and a sugar of a controlled, critical particle size. By critically controlling the distribution of the pregelatinized starch particle size, as well as the sugar particle size, the unexpected and synergistic, recited, improved textural and appearance characteristics are obtained.

The pregelatinized starch employed in the dry instant pudding mix is of a type that is common in the pudding mix art. This can include chemically as well as physically modified pregelatinized starches from sources such as corn, waxy maize, tapioca, wheat, potato, etc. Nonetheless, it is more preferred that the starch be tapioca. It is also preferred that if the starch is chemically modified, that the chemical modifiation be either a hydroxypropylation, a cross-linking or a combination thereof. Critically the pregelatinized starch has a particle size distribution wherein a minimum of 1% and a maximum of 10%, by weight of the starch, is retained on a 230 mesh U.S. Standard screen, and at least a majority by weight of the starch passes through a 400 mesh U.S. Standard screen. Preferably, the starch has a particle size wherein 55 to 80% by weight of the starch passes through a 400 mesh U.S. Standard screen. The controlled particle size of the starch in combination with the powdered sugar provide unexpected textural and appearance benefits as compared to a regular starch. A regular starch would generally have a particle size wherein less than 50% by weight of the starch particles pass through a 400 mesh U.S. Standard Screen, with substantial amount of the starch being retained on a 230 mesh U.S. Standard screen (e.g. greater than 10%, usually greater than 35–50% by weight of the starch). A preferred physically pregelatinized starch for use in the present invention is prepared by the process of Pitchon, et al. disclosed in U.S. Pat. No. 4,280,851, which is hereby incorporated by reference.

The sugar particle size is also controlled. The sugar component incorporates a powdered sugar which has a particle size wherein at least 90%, by weight of the sugar, passes through a 200 mesh U.S. Standard Screen. This powdered sugar comprises from 5 to 60% by weight of the total sugar in the dry instant pudding mix. Preferably the powdered sugar is incorporated at a level of 15% to 40% by weight of the total sugar for increased textural and appearance benefits. The minimum effective level of sugar to obtain the textural and appearance benefits is 5% by weight of the total sugar, with 60% by weight of the total sugar being the maximum effective level of powdered sugar while still maintaining disperseability and without lumping of the dry pudding mix upon hydration. This powdered sugar in combination with the controlled starch particle size distribution provides unexpected textural and appearance benefits in view of sugar commonly employed in dry instant pudding mixes. The sugar commonly used in pudding mixes has a standard particle size, such that 70%, maximum by weight, is retained on a 60 mesh screen; 10%, maximum by weight, passes through a 100 mesh U.S. Standard screen; and 0.5%, maximum by weight, passes through a 200 mesh U.S. Standard screen. The powdered sugar of the invention even provides substantial and unexpected benefits over a sugar with an intermediate particle size, as in U.S. Pat. No. 4,006,262, with the sugar having 85% minimum by weight through a 70 mesh secreen with 35% maximum by weight on a 100 mesh U.S. Standard screen and 2% maximum by weight through a 200 mesh screen. The sugar can be from any source available in dry crystalline from, such a sucrose and dextrose.

In an instant pudding mix, the key factor affecting pudding smoothness, creaminess and surface gloss is the pregelatinized starch. The more homogenous sized the pregelatinized starch particles are in size, the smoother and creamier the texture and the glossier the appearance of the set pudding is. Some pregelatinized starches contain agglomerates or granule fractions pasted together making the starch particle size distribution extremely non-homogenious. Non-homogenous starch particles create a texture which is less smooth and creamy (compared to homogenous starch particles) and reflect light unevenly from the surface reducing glossiness. Thus, it is preferred that the starch particles used in the pudding mix exclude agglomerates.

The discovery that a pregelatinized starch with a particle size distribution such that at least 1% and up to 10% of the starch consists of pregelatinized starch particles having diameter of 63 microns or more would produce a creamy, smooth pudding was unexpected in light of the findings of Carpenter et al. However, it is critical that less than 1% of the starch, and preferably less than 0.5% of the starch, possesses a particle diameter of 105 microns or greater (retained on a 140 mesh screen). Furthermore, it is also critical that less than 3% of the starch, and preferably less than 1.5% of the starch has particle diameters of 88 microns or greater (retained on a 170 mesh screen). Additionally, in the composition of the present invention, less than 7% of the starch, and preferably less than 6% of the starch possesses particle diameters of 74 microns or greater (retained on a 200 mesh screen). It is also preferred that at least 10%, more preferably at least 15%, and most preferably at least 20% of the starch is composed of starch particles with a diameter of 20 microns or less.

In addition to the above, it is preferred that the starch particle size distribution be such that at least about 6% and not more than about 34%, by weight, be between 38 and 44 microns (passing through a 325 mesh screen and being retained on a 400 mesh screen). It is further preferred that between about 6% and about 22% of the starch has particle diameters between 38 and 44 microns. Also, it is preferred that between about 3% and about 30%, by weight of the starch, is between 44 and 63 microns in diameter (passing through a 230 mesh screen and being retained on a 325 mesh screen). It is more preferred that between about 3% and about 20% of the starch be in particles with a diameter between 44 and 63 microns.

As a consequence of the small starch particle sizes, there are an extremely large number of starch particles per unit weight. Moreover, it is difficult to rapidly and uniformly hydrate the instant dry pudding mix when the mix is composed of starch particles of this number and size. Nevertheless, it is necessary to rapidly and uniformly hydrate the mix to achieve the desirable pudding. If the ingredients are not adequately dispersed, the gel formation traps some particles in non-uniform areas. This invention uses powdered sugar to adequately disperse the starch particles. It is theorized that the powdered sugar disolves faster and provides a sufficient number of particles that effectively separate all the starch particles allowing each starch particle to swell independently and uniformly rather than lumping: one starch particle sticking to neighboring starch particles upon hydration. The combination of the starch particle distribution with the powdered sugar is critical to obtaining the improved texture and appearance while providing a dry instant pudding mix which will rapidly and uniformly, disperse and hydrate.

The pudding mix of this invention contains levels of the various ingredients as are common in the art, for example: sugar at 25 to 85% (preferably 50 to 80%); pregelatinized starch at 5 to 25% (preferably 10 to 20%); setting agents at 1–5% (preferably 2–4%); flavor at 0 to 3%; optionally cocoa at 0 to 25%; and optionally fat at 0 to 20%, all percents being by weight of the total composition. The setting agents are preferably an alkali pyrophosphate and an alkali orthophosphate.

The instant pudding mix is prepared by mixing the pudding mix with milk and allowing the mixture to set. For example, about 100 grams of mix is mixed with 2 cups (473 ml) of milk. The mix rapidly and uniformly disperses and hydrates resulting in a pudding which possesses an optimum creamy, smooth and glossy texture. In addition to expert and consumer evaluations of the pudding's texture and appearance characteristics, the following tests have been employed, as detailed below.

To measure glossiness, a Gardner Glossgard IIa Gloss-Meter with a 60° angle was employed. The pudding is first prepared by mixing 99 gms of the dry pudding mix with two cups (473 ml) of cold milk and blending in an electric mixer. Then the pudding is allowed to stand at room temperature to set. A smooth, flat pudding surface is important to obtaining an accurate pudding gloss measurement. The pudding is placed under the meter and the Gloss-Meter a photovolt reflection meter) is lowered as close as possible without actually touching the pudding to the pudding surface. Readings were taken on the pudding surface after 30 and 60 minutes, repeating each reading with a duplicate sample (total of 20 readings) and with a constant height setting for all puddings. The gloss meter operates by shining a light on an object surface and measuring the amount of reflected light received at a detector. Higher readings indicate glossier surfaces. The gloss meter readings were shown to correlate with eye measurements of gloss by a panel of experts.

A preferred means of obtaining the starch particle size distribution of the present invention is to pregelatinize and dry the starch in any manner effective to produce a coarse starch material. This coarse starch material is then ground. Unexpectedly, it was found that by grinding coarse starch, a very uniform distribution of starch particles, which conforms to the composition described above, is obtained.

It is preferred that the dry, pregelatinized starch before grinding has a particle size distribution such that between about 1% and about 25% of the starch is retained on an 80 mesh, U.S. Standard screen (diameter of 177 microns or greater), between about 25% and about 75% is retained on a 230 mesh screen and between about 10% and about 50% passes through a 400 mesh screen. It is more preferred that between about 1.5% and about 15% of the starch is retained on an 80 mesh screen, between about 45% and about 60% is retained on a 230 mesh screen, and that between about 15% and about 40% passes through a 400 mesh screen. It is most preferred that between about 1.5% and about 10% of the pregelatinized starch is retained on an 80 mesh screen, between about 45% and about 60% of the starch is retained on a 230 mesh screen, and that between about 20% and about 30% of the starch passes through a 400 mesh screen. Dry, pregelatinized starch with this size distribution is obtained by the spray-cook process of Pitchon et al. (U.S. Pat. No. 4,280,851) when the atomization orifice is increased. The preferred range atomization orifice diameters for the present invention is from about 0.0635 to about 0.066 inches.

Next the dry, pregelatinized starch is ground. It is preferred that the dry, pregelatinized starch be ground to produce a target particle size distribution wherein a trace of the starch is retained on an 80 mesh screen, up to about 2% of the starch is retained on a 230 mesh screen, and between about 55% and about 80%, but more preferably between about 60% and about 80% of the starch passes through a 400 mesh screen. Grinding the pregelatinized, coarse starch to a target within the preferred particle size distribution produces the desired, homogenous, tolerant starch particle size distribution.

The following examples are meant for illustrative purposes only with the appended claims providing the definition of the invention.

EXAMPLE I

A coarse, dry, pregelatinized tapioca starch was prepared by spray cooking according to the method of Pitchon et al., U.S. Pat. No. 4,280,851 wherein the atomizing nozzle had an orifice diameter of 0.0635 inches. This coarse, pregelatinized starch had the following particle size distribution: 50% was retained on a 230 mesh screen, 23% passed through the 230 mesh but was retained on a 400 mesh screen; and 27% passed through the 400 mesh screen. After being pregelatinized, the starch was then ground. The target particle size distribution for material exiting the grinder was: a trace of the starch retained on an 80 mesh screen, 2% retained on a 230 mesh screen, and 65% passing through a 400 mesh screen. As a result of this process—making coarse pregelatinized starch particle and grinding—the following starch particle size distribution, by weight, was obtained: 24% had diameters between 0 and 20 microns; 41% had diameters between 20 and 38 microns; 19% had diameters between 38 and 44 microns; 14% had diameters between 44 and 63 microns; 2% had diameters between 63 and 74 microns; 1% had diameters between 74 and 88 microns; and only a trace of material had diameters between 88 and 105 microns, or in excess of 105 microns. This distribution data is displayed in FIG. 1.

Furthermore, the distribution of this starch among fractions with particle diameters in excess of 63 microns was unexpected. Noticably, almost equal weights of starch had particle diameters either between 63 and 74 microns or between 74 and 88 microns. The larger diameter fractions accounted for 15% of the starch mass. This distribution—43% between 63 and 74 microns; 42% between 74 and 88 microns; 12% between 88 and 105 microns; and 3% in excess of 105 microns—is displayed in FIG. 2.

A dry instant pudding mix was formulated containing the following:

| Ingredient | mass (in gm) |
| --- | --- |
| sugar | 75.7 |
| pregelatinized starch (with the above described particle size distribution) | 18.0 |
| sodium phosphate | 3.5 |
| salt | 0.5 |
| mono and diglycerides | 0.5 |
| vegetable oil | 0.4 |
| flavor and color | 0.6 |

This mix was then blended with 2 cups (473 ml) of cold milk by an electric mixer and allowed to set.

EXAMPLE 2

A dry, pregelatinized tapioca starch was produced according to U.S. Pat. No. 4,280,851 using the usual atomizing orifice of between 0.040 and 0.045 inches. This starch had the following particle size distribution by weight: 1% was retained on an 80 mesh screen; 35% passed through the 80 mesh screen but was retained on a 230 mesh screen; 24% passed through the 230 mesh screen but was retained on a 400 mesh screen; and 40% passed through the 400 mesh screen.

Figure 3:
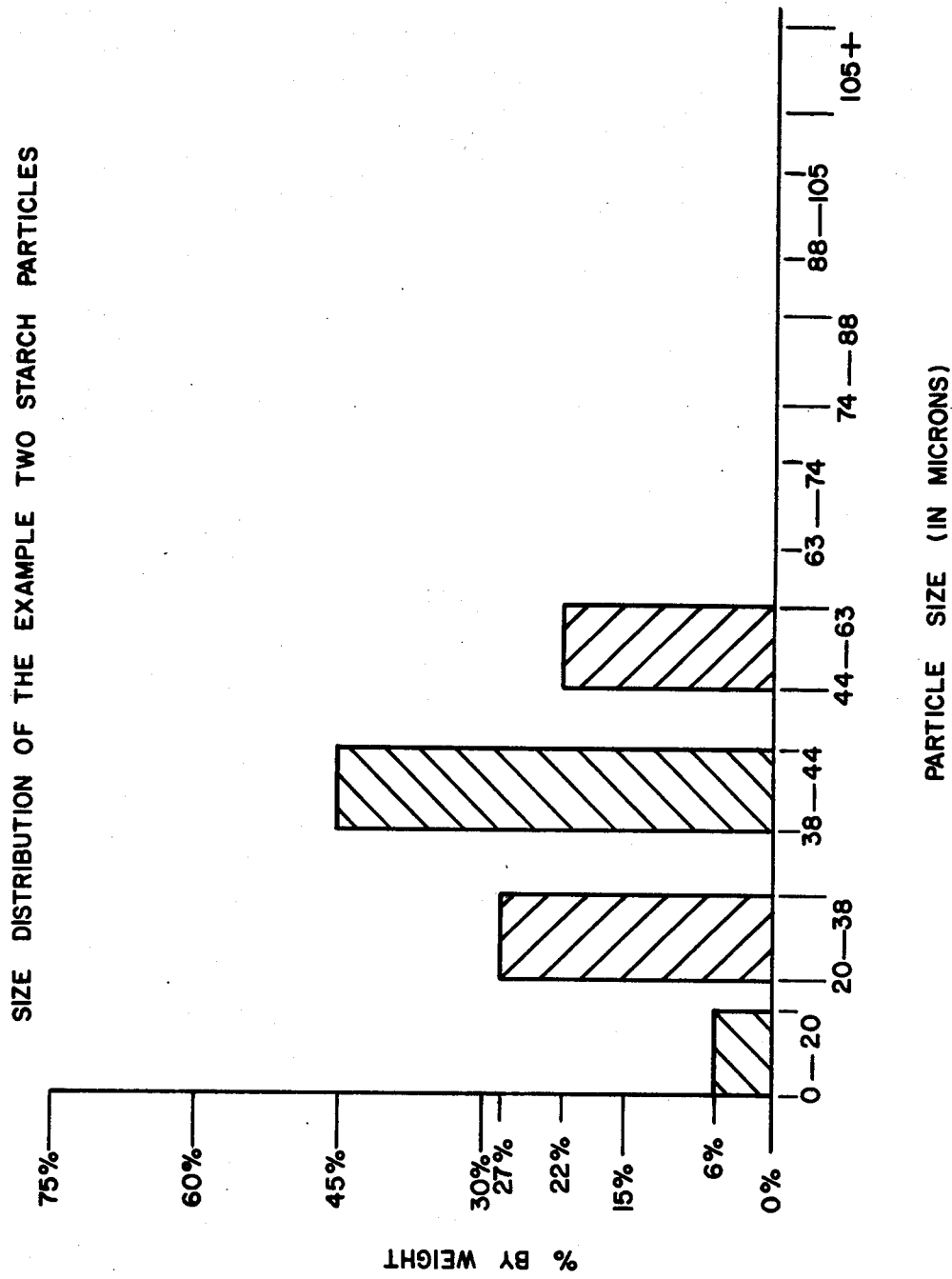
FIG. 3 shows the distribution of the Example 1 starch particles having a diameter of at least 63 microns within each of four size fractions.

This dry, pregelatinized starch was then ground to conform to the critical parameters of U.S. Pat. No. 4,361,592—less than 1% by weight, of the starch particles had a 63 microns or greater diameter and between 55% and 80% had diameters of 38 microns or less. As a result of grinding the starch to meet these criteria, a trace amount of the starch was composed of starch particles having a diameter of 63 microns or greater; 22% of this starch was particles with a diameter between 44 and 63 microns; 45% was particles with a diameter between 38 and 44 microns; 27% was particles with a diameter between 20 and 38 microns; and 6% had diameters between 0 and 20 microns. The particle size distribution of this starch is displayed in FIG. 3.

Figure 2:
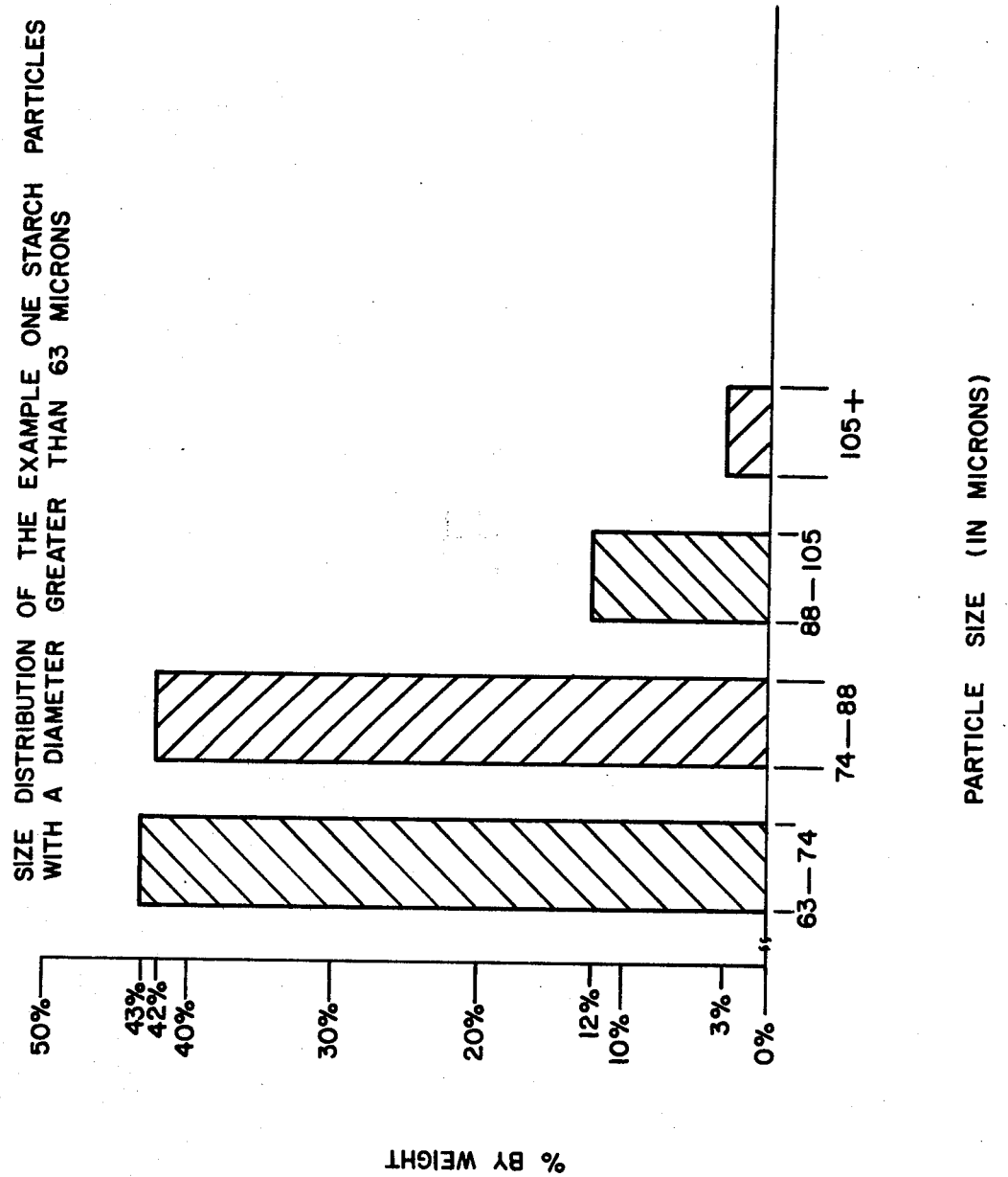
FIG. 2 shows the distribution of the Example 2 starch particles within each of eight size fractions.
Figure 4:
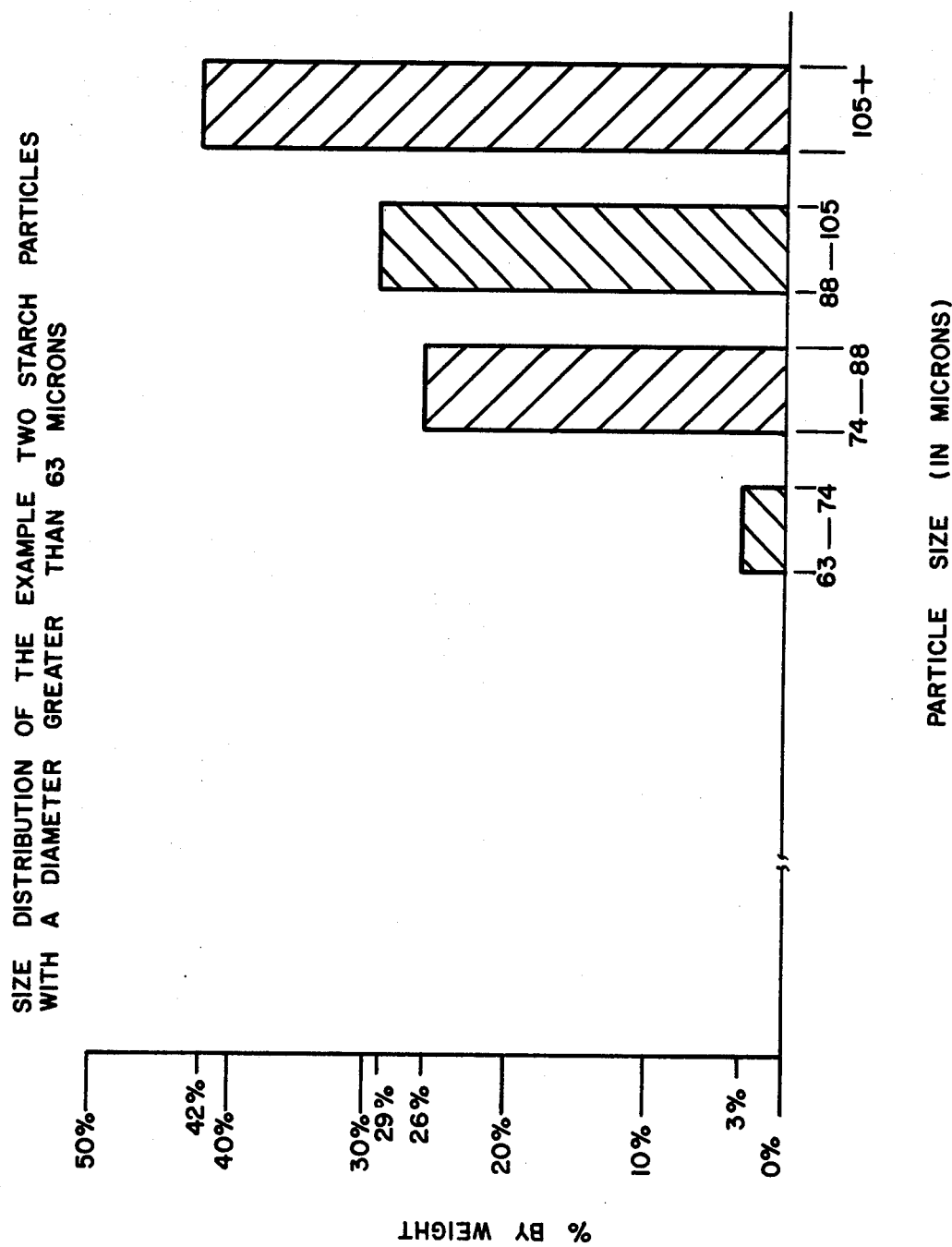
FIG. 4 shows the distribution of the Example 2 starch particles having a diameter of at least 63 microns within each of four size fractions.

After having produced the starch for a pudding mix, the grinding process was continued until an appreciable quantity of starch with particle diameters of 63 microns or greater was accumulated. Once this appreciable quantity was collected, this starch was seived to determine the particle size distribution of this starch. A plurality of this starch, 42% by weight, had particle diameters of 105 microns or more; 29% had particle diameters of 88 to 105 microns; 6% had particle diameters between 74 and 88 microns; and only 3% had diameters between 63 and 88 microns. This distribution is displayed in FIG. 4 and is sloped in a direction inverse to that exhibited by the Example 1 material as depicted in FIG. 2.

The above described starch was substituted into the Example 1 formula for an instant pudding mix. Thereafter this mix was also blended with 2 cups (473 ml) of cold milk and allowed to set.

EXAMPLE 3

The unground starch produced by the method of Pitchon et al. (U.S. Pat. No. 4,280,851) was substituted into the Example 1 pudding formula. This mix was blended with 2 cups (473 ml) of a cold milk and allowed to set.

The set puddings of Examples 1, 2 and 3 were compared. While Examples 1 and 2 were significantly better than Example 3 in smoothness, creaminess and gloss, little textural difference was found through taste testing Examples 1 and 2.

EXAMPLES 4-20

A quantity of starch was prepared according to Example 1. However, before this starch was incorporated into the pudding mix, the starch was seived to remove all starch particles having a diameter of 63 microns or greater. Hereinafter, this starch having particle diameters of 63 microns or more is referred to as fraction A. A portion of fraction A was further seived so as to produce 3 fractions. These 3 fractions were composed of starch particles having diameters between 63 and 74 microns; between 74 and 105 microns; and 105 microns or greater. The starch particles with diameters between 74 and 105 microns were discarded. Hereinafter the starch fraction composed of particles with diameters between 63 and 74 microns will be referred to as fraction B and the starch with diameters of 105 microns or larger is fraction C.

The starch without particles having a diameter of 63 microns or more was combined with between 1 and 20 percent of either starch fraction A or B or with between 1 and 15 percent of starch fraction C. Once the starch without 63 microns or greater particles was combined with one of the starch fractions containing only starch particles with a diameter of 63 microns or greater, the starch was well blended and mixed into the formula of Example 1. The resulting mix was blended with 2 cups (473 ml) of cold milk and allowed to set. Once these puddings had set, the light reflectance from these samples was measured by a Glossmeter as described above.

The readings from the Glossmeter are displayed in Table 1.

TABLE 1

| Amount of Starch Fraction Added (in percent by weight) | GLOSSMETER READINGS Fraction Which Was Added | | |
|---|---|---|---|
| | C | B | A |
| 1 | 62 | 61 | 61 |
| 3 | 61 | 61 | 61 |
| 5 | 62 | 65 | 64 |
| 10 | 59 | 62 | 59 |
| 15 | 46 | 63 | 42 |

TABLE 1-continued

| Amount of Starch Fraction Added (in percent by weight) | GLOSSMETER READINGS Fraction Which Was Added | | |
|---|---|---|---|
| | C | B | A |
| 20 | — | 51 | 42 |

Figure 5:
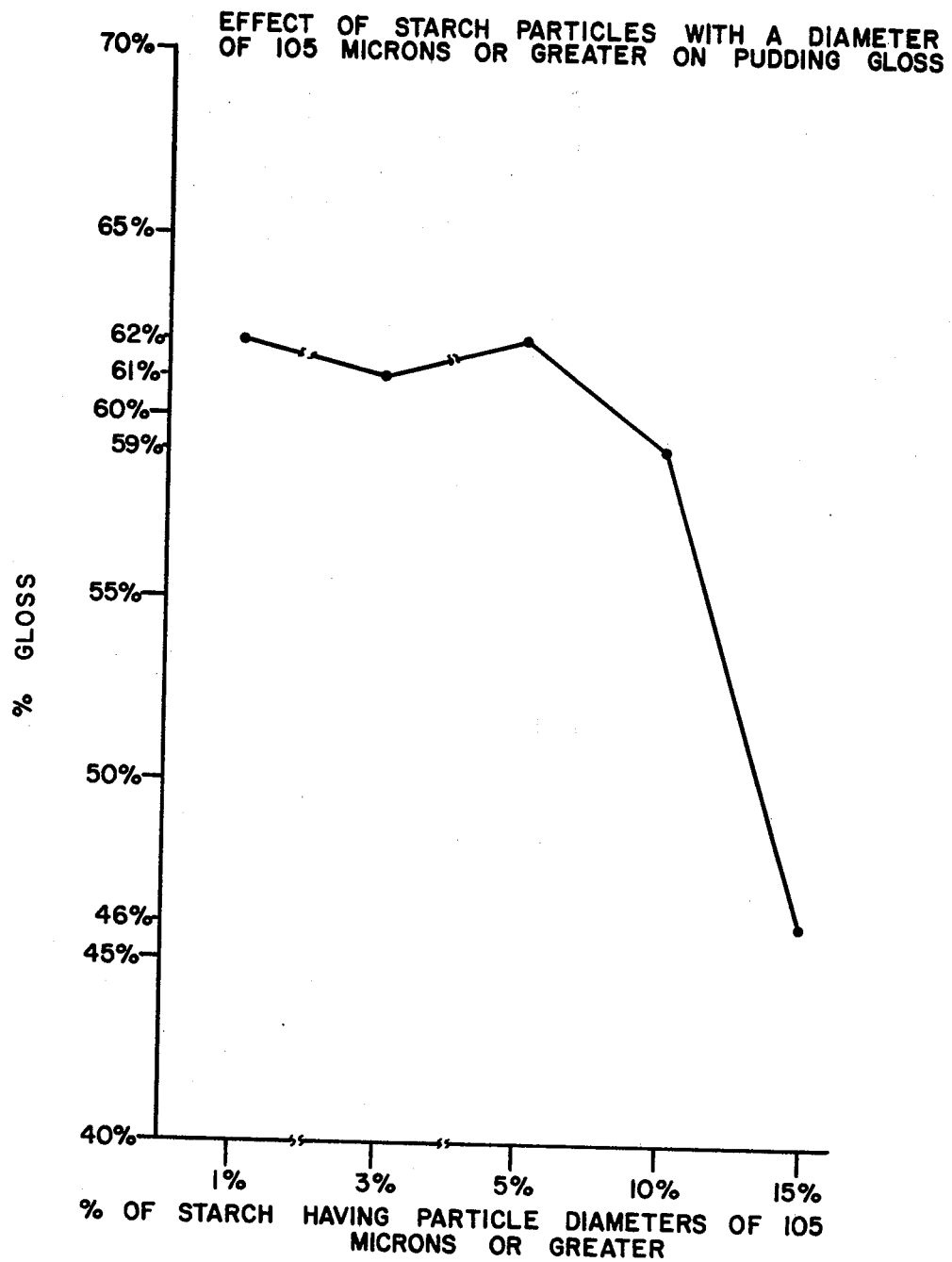
FIG. 5 shows the effect of incorporating starch particles with a diameter of 105 microns or greater into the instant pudding mix on the resulting pudding gloss.
Figure 6:
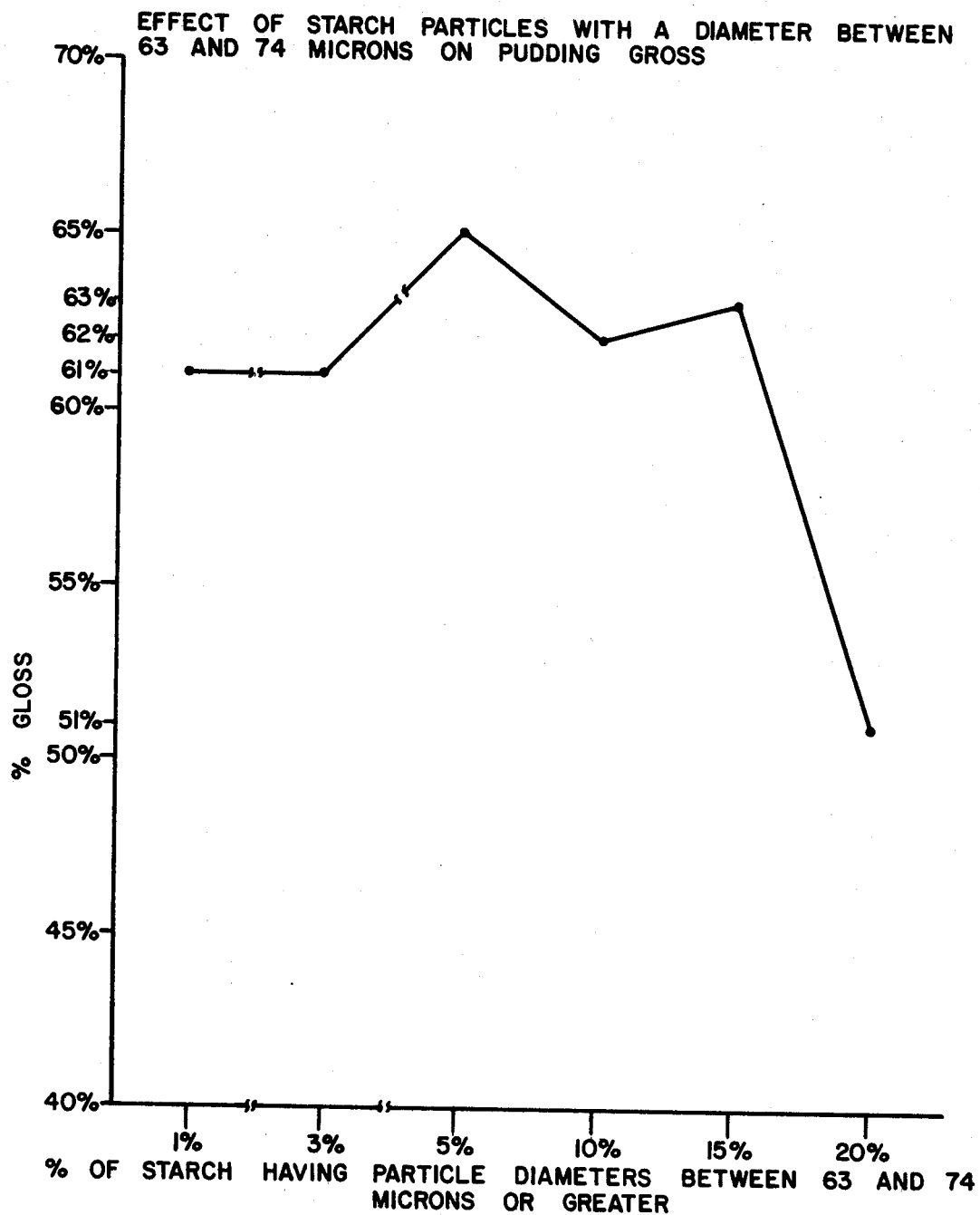
FIG. 6 shows the effect of incorporating starch particles with a diameter of between 63 and 74 microns into the instant pudding mix on the resulting pudding gloss.
Figure 7:
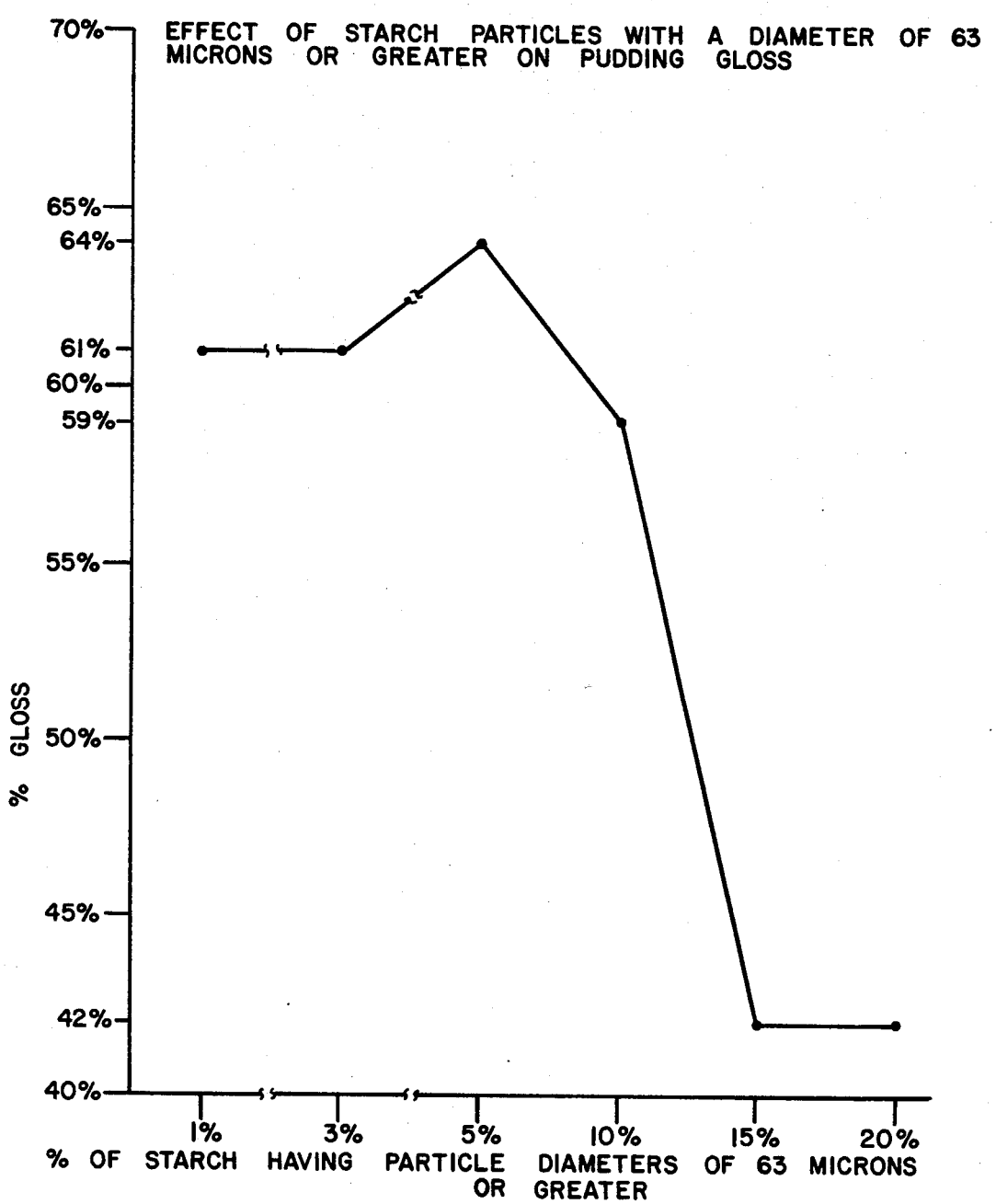
FIG 7 shows the effect of incorporating starch particles with a diameter of 63 microns or greater into the instant pudding mix on the resulting pudding gloss.

The trends in these data can be more readily seen by reference to FIGS. 5, 6 and 7. FIG. 5 shows the set pudding made with up to 5% of the starch having particle diameters of 105 microns or greater had an acceptable Glossmeter reading: greater than 60. In contrast, FIG. 6 shows that the high gloss is still obtained in a pudding wherein 15% of the starch had particle diameters of 63 microns or greater but less than 74 microns. When fraction A was combined with the small starch particles, FIG. 7 shows that the mix would produce a glossy pudding when up to 5% of the starch, by weight, had particle diameters of 63 microns or more.

We claim:

1. An improved dry instant pudding mix that disperses and hydrates in a rapid and uniform manner to produce a smooth and creamy textured, glossy pudding comprising:
(A) a pregelatinized starch component wherein:
  (i) said pregelatinized starch is between about 5% and about 25%, by weight, of the pudding mix,
  (ii) between at least 1% and up to 10%, by weight, of said pregelatinized starch has a particle size distribution greater than about 63 microns, but
    (a) less than about 1%, by weight, of said pregelatinized starch component has particle sizes greater than about 105 microns,
    (b) less than about 3%, by weight of said pregelatinized starch component has particle sizes greater than about 88 microns, and
    (c) less than about 6%, by weight of said pregelatinized starch component has particle sizes greater than about 74 microns,
  (iii) between about 55% and about 80%, by weight, of said starch component has particle sizes less than about 38 microns;
(B) a sugar component wherein:
  (i) said sugar component is between about 25% and about 85%, by weight of the pudding mix,
  (ii) between about 15% and about 40% of said sugar component is powdered sugar, and
  (iii) at least about 90% of the sugar component has particle sizes less than about 74 microns;
(C) a setting component wherein between about 1% and about 5%, by weight of the pudding mix is said setting component and said setting component consists essentially of an alkali pyrophosphate and an alkali orthaphosphate; and
(D) a flavoring component.

2. A pudding mix according to claim 1 wherein between at least about 1.5% and up to 10%, by weight, of said pregelatinized starch particles have a diameter greater than about 63 microns.

3. A pudding mix according to claim 2 wherein less than about 0.5%, by weight of said pregelatinized starch, has a particle diameter greater than about 105 microns and less than about 2%, by weight of said pregelatinized starch, has a particle diameter greater than about 88 microns.

4. A pudding mix according to claim 2 wherein at least 10% by weight of said pregelatinized starch, has a particle diameter of less than about 20 microns.

5. A pudding mix according to claim 2 wherein between about 6% and about 34% by weight of said pregelatinized starch, has particle diameters between about 38 and about 44 microns and between about 3% and about 30%, by weight of the said starch, has particle diameters between about 44 and 63 microns.

* * * * *